United States Patent Office 3,526,656
Patented Sept. 1, 1970

3,526,656
(1-ARYLCYCLOBUTYL)CARBONYL CARBAMIC ACID DERIVATIVES
Donald E. Butler, Ann Arbor, Mich., assignor to Parke, Davis & Company, Detroit, Mich., a corporation of Michigan
No Drawing. Filed May 25, 1967, Ser. No. 641,159
Int. Cl. C07c 127/22
U.S. Cl. 260—471                                                 9 Claims

ABSTRACT OF THE DISCLOSURE

[(1 - phenylcyclobutyl)carbonyl]urea compounds and [(1-phenylcyclobutyl)carbonyl]carbamic acid lower alkyl esters, in which the phenyl groups may be substituted by chlorine, bromine, methyl, methoxyl, or trifluoromethyl, useful as pharmacological agents that exhibit central nervous system depressant activity and anticonvulsant activity and anticonvulsant activity; and their production by (a) reacting an appropriately substituted (1-phenylcyclobutyl)carbonyl isocyanate with ammonia or a lower alkanol, and (b) reacting an appropriately substituted (1-phenylcyclobutyl)carbonyl halide with urea or a carbamic acid lower alkyl ester.

SUMMARY AND DETAILED DESCRIPTION

The present invention relates to new carbamic acid derivatives that are useful as pharmacological agents and to methods for their production. More particularly, the invention relates to new [(1-arylcyclobutyl)carbonyl]urea compounds and to [(1-arylcyclobutyl)carbonyl]carbamic acid ester compounds, which compounds can be represented by the general formula

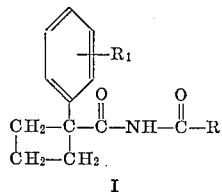

I where R is $NH_2$ or a lower alkoxy group; and $R_1$ is hydrogen, chlorine, bromine, methyl, methoxyl, or trifluoromethyl. The lower alkoxy groups represented by R in the foregoing formula are those not having more than four carbon atoms and are preferably methoxyl or ethoxyl.

In accordance with the invention, compounds having Formula I above are produced by reacting a (1-arylcyclobutyl)- carbonyl isocyanate compound having the formula

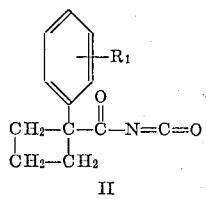

II with a compound having the formula

R—H
III

where R and $R_1$ have the aforementioned significance. When R is a lower alkoxy group, that is, when the reactant having Formula III is a lower alkanol, it is most convenient and desirable to carry out the reaction in an excess of this reactant, and added solvent is not required. If desired, however, any of a number of unreactive solvents may also be used as the reaction medium. Suitable solvents for this purpose are aromatic hydrocarbons, such as benzene and toluene; halogenated hydrocarbons, such as carbon tetrachloride and ethylene dichloride; various ethers, such as diethyl ether, dioxane and tetrahydrofuran; and N,N-dimethylformamide; as well as mixtures of these. When the reactant having Formula III is liquid ammonia, best results are obtained when an excess of this reactant is employed and no additional solvent is added. If desired, however, in this case also, the solvents named above may be used. Such an added solvent is required if the reactant having Formula III is gaseous rather than liquid ammonia. The temperature and duration of the reaction are not particularly critical. When the reactant of Formula III is a lower alkanol, a temperature in the range of from 0 to 100° C. may be used, and the reaction is normally complete within a period that may be varied between about 5 minutes and 24 hours. With this reactant the reaction is most conveniently carried out by heating the reaction mixture under reflux overnight. When the reactant of Formula III is liquid ammonia, the reaction can be conveniently carried out by contacting the reactants at the boiling point of the liquid ammonia, and then allowing any excess ammonia to evaporate. If gaseous ammonia is used in an unreactive solvent, the reaction can readily be carried out at room temperature and is normally complete within a period that may vary from 5 minutes to several hours or more. While equivalent quantities of reactants may be used, it is desirable to employ an excess of the reactant of Formula III to insure completeness of reaction.

The (1-arylcyclobutyl)carbonyl isocyanate compounds having Formula II that are required as starting materials in the foregoing procedure are prepared as described in the following general reaction scheme. An arylacetonitrile compound having the formula

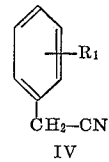

IV is reacted with 1,3-dibromopropane in the presence of sodium hydride in dimethylsulfoxide solution to give a 1-arylcyclobutanecarbonitrile compound having the formula

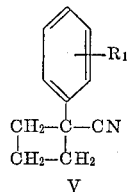

V which is then recated with hydrogen peroxide in the presence of aqueous base, and the resulting 1-arylcyclobutanecarboxamide compound having the formula

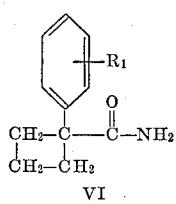

VI is reacted with oxalyl chloride to give the desired (1-arylcyclobutyl)carbonyl isocyanate starting materials. In the foregoing formulas, $R_1$ has the same means as previously given.

Also in accordance with the invention, compounds having Formula I above are produced by reacting a (1-arylcyclobutyl)carbonyl halide compound having the formula

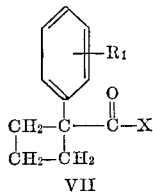

VII with a carbamic acid derivative having the formula

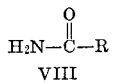

VIII where X is halogen, preferably chlorine, and R and $R_1$ are as previously defined. The reaction is best carried out by contacting the reactants in the absence of a solvent, and then heating the resulting mixture at a temperature between about 100 and 200° C. for a period that may vary from about 5 minutes to about 5 hours. Although a solvent is not required, and it is preferable not to employ one, if desired, an unreactive solvent having a boiling point higher than 100° C. may be used. Some examples of such a solvent are toluene, xylene, chlorobenzene, 1,2,3-trichloropropane, diethylene glycol dimethyl ether, dibutyl ether, and N,N-dimethylformamide. Mixtures of these solvents may also be employed. While the reaction conditions may be varied over the wide ranges given above, the preferred temperature is one between 110 and 130° C., and the preferred duration is a period of from 15 to 30 minutes. Equivalent quantities of the reactants may be employed. To insure optimum yields and completeness of reaction, however, it is preferable to use an excess of the carbamic acid derivative having Formula VIII.

The (1-arylcyclobutyl)carbonyl halide compounds required above as starting materials can be prepared by reacting a 1-arylcyclobutanecarbonitrile compound having Formula V above with aqueous base and acidifying the reaction product to give a 1-acrylcyclobutanecarboxylic acid compound having the formula

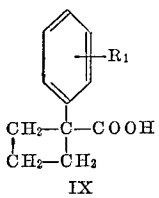

IX which is reacted with a halogenating agent, such as thionyl chloride, to give the desired starting materials.

The compounds of the invention are new chemical compounds that are useful as pharmacological agents. They are active in producing a depressant effect on the central nervous system. By virtue of this activity, they are of value as tranquilizing agents and in the management of states of agitation. The compounds of the invention are also active as anticonvulsant agents. Their anticonvulsant activity can be measured by determining their ability to prevent the occurrence of convulsions following electroshock. They are active upon oral administration, but can also be given by the parenteral route, if desired. They can be combined with either a solid or liquid carrier or diluent and made available in such pharmaceutical forms as tablets, capsules, powders, and aqueous and non-aqueous suspensions and solutions.

The invention is illustrated by the following examples.

EXAMPLE 1

A solution of 30 g. of [1-(o-chlorophenyl)cyclobutyl] carbonyl isocyanate in 250 ml. of anhydrous methanol is heated under reflux for 16 hours and is then evaporated under reduced pressure to give {[1-(o-chlorophenyl)cyclobutyl]carbonyl}carbamic acid, methyl ester; M.P. 113–115° C., following crystallization from n-heptane-benzene after treatment with decolorizing charcoal.

The [1-(o-chlorophenyl)cyclobutyl]carbonyl isocyanate starting material required in the foregoing procedure is prepared as follows.

(I) Preparation of 1-(o-chlorophenyl) cyclobutanecarbonitrile. A solution of 303 g. of o-chlorophenylacetonitrile and 444 g. of 1,3-dibromopropane in 1000 ml. of anhydrous ether is slowly added to a well-stirred suspension of 101 g. of sodium hydride in 2500 ml. of dimethylsulfoxide in a nitrogen atmosphere while the temperature is maintained at about 25–35° C. The resulting mixture is diluted with 500 ml. of anhydrous ether, stirred for 16 hours at room temperature, and then treated successively with 100 ml. of isopropyl alcohol and 1500 ml. of water. The ether phase is separated, and the aqueous phase is extracted several times with ether. The ether extracts are combined with the separated ether phase and the resulting solution is dried and evaporated, and the liquid residue is distilled under reduced pressure to give 1-(o-chlorophenyl)cyclobutanecarbonitrile, B.P. 100–120° C./0.3 mm. Hg; M.P. 57–59° C. following crystallization from n-hexane.

(II) Preparation of 1-(o-chlorophenyl)cyclobutanecarboxamide. A mixture consisting of 191 g. of 1-(o-chlorophenyl) cyclobutanecarbonitrile, 3 ml. of 25% aqueous sodium hydroxide, 473 ml. of 30% aqueous hydrogen peroxide, and 1600 ml. of absolute ethanol is stirred at room temperature for 64 hours, heated under reflux for one hour, and then cooled and neutralized with dilute sulfuric acid. Most of the ethanol is removed by distillation, the residue is diluted with an equal volume of water, and the resulting aqueous mixture is extracted well with chloroform. The chloroform extract is dried and evaporated to give 1-(o-chlorophenyl)-cyclobutanecarboxamide; M.P. 104–106° C. following successive crystallization from n-heptane-benzene and toluene-petroleum ether.

(III) Preparation of [1-(o-chlorophenyl)cyclobutyl]-carbonyl isocyanate. To a solution of 150 g. of 1-(o-chlorophenyl)cyclobutanecarboxamide in 800 ml. of ethylene dichloride is added 200 g. of oxalyl chloride, and the resulting solution is stirred until gas evolution ceases, and then it is heated under reflux for 24 hours. The solvent is removed by distillation and the residue distilled under reduced pressure to give [1-(o-chlorophenyl)cyclobutyl] carbonyl isocyanate, B.P. 83–85° C./1 mm. Mg.

EXAMPLE 2

Utilizing the procedure described in Example 1 above for the preparation of {[1-(o-chlorophenyl)cyclobutyl]-carbonyl}carbamic acid, methyl ester, the following [(1-arylcyclobutyl)carbonyl]carbamic acid esters are obtained from the reaction of an appropriately substituted (1-arylcyclobutyl)carbonyl isocyanate compound with an excess of anhydrous methanol or ethanol. In each case the melting point given is that of the product as purified by crystallization from n-heptane-benzene.

(A) [(1-phenylcyclobutyl) carbonyl] carbamic acid, methyl ester; M.P. 109–110° C.

(B) [(1-phenylcyclobutyl) carbonyl] carbamic acid, ethyl ester; M.P. 88–90° C.

(C) {[1-(m-chlorophenyl) cyclobutyl] carbonyl} carbamic acid, methyl ester; M.P. 124–125° C.

(D) {[1-(p-chlorophenyl) cyclobutyl] carbonyl} carbamic acid, methyl ester; M.P. 104–106° C.

(E) {[1-(o-bromophenyl) cyclobutyl] carbonyl} carbamic acid, methyl ester; M.P. 104–106° C.

(F) {[1-(m-bromophenyl) cyclobutyl] carbonyl} carbamic acid, methyl ester; M.P. 119–120° C.

(G) [(1-o-tolylcyclobutyl) carbonyl] carbamic acid, methyl ester; M.P. 99–101° C.

(H) [(1-m-tolylcyclobutyl) carbonyl] carbamic acid, methyl ester; M.P. 123–125° C.

(I) [(1-p-tolylcyclobutyl) carbonyl] carbamic acid, methyl ester; M.P. 86–88° C.

(J) {[1-($\alpha,\alpha,\alpha$-trifluoro-o-tolyl) cyclobutyl] carbonyl} carbamic acid, methyl ester; M.P. 124–126° C.

(K) {[1-($\alpha,\alpha,\alpha$-trifluoro-m-tolyl) cyclobutyl] carbonyl}carbamic acid, methyl ester; M.P. 109–110° C.

(L) {[1-($\alpha,\alpha,\alpha$-trifluoro-p-tolyl) cyclobutyl] carbonyl}carbamic acid, methyl ester; M.P. 145–146° C.

(M) {[1-(o-chlorophenyl) cyclobutyl] carbonyl} carbamic acid, ethyl ester; M.P. 100–101° C.

(N) {[1-(o-bromophenyl) cyclobutyl] carbonyl} carbamic acid, ethyl ester; M.P. 88–90° C.

(O) {[1-(p-chlorophenyl) cyclobutyl] carbonyl} carbamic acid, ethyl ester; M.P. 110–111° C.

(P) [(1-o-tolylcyclobutyl) carbonyl] carbamic acid, ethyl ester; M.P. 99–101° C.

(Q) {[1 - ($\alpha,\alpha,\alpha$ - trifluoro - o-tolyl)cyclobutyl]carbonyl}carbamic acid, ethyl ester; M.P. 86–87° C.

(R) {[1 - (p - methoxyphenyl)cyclobutyl]carbonyl} carbamic acid, methyl ester; M.P. 59–61° C.

(S) {[1 - (m - chlorophenyl)cyclobutyl]carbonyl}carbamic acid, ethyl ester; M.P. 138–140° C.

(T) {[1 - (m - bromophenyl)cyclobutyl]carbonyl} carbamic acid, ethyl ester; M.P. 137–139° C.

(U) [(1 - m - tolylcyclobutyl)carbonyl]carbamic acid, ethyl ester; M.P. 108–109° C.

(V) {[1 - ($\alpha,\alpha,\alpha$ - trifluoro - p-tolyl)cyclobutyl]carbonyl}carbamic acid, ethyl ester; M.P. 131–133° C.

(W) {[1 - ($\alpha,\alpha,\alpha$ - trifluoro - m-tolyl)cyclobutyl]carbonyl}carbamic acid, ethyl ester; M.P. 114–116° C.

(X) {[1 - (p - methoxyphenyl)cyclobutyl]carbonyl}-carbamic acid, ethyl ester; M.P. 98–99° C.

The (1-arylcyclobutyl)carbonyl isocyanate starting materials required for the preparation of the foregoing products are prepared in a manner analogous to that described in Example 1 above for the preparation of [1-(o-chlorophenyl)cyclobutyl]-carbonyl isocyanate. The following 1 - arylcyclobutanecarbonitrile intermediates were prepared starting from an appropriately substituted arylacetonitrile compound by means of the reaction described in Procedure I of that example:

(a) 1 - (m - chlorophenyl)cyclobutanecarbonitrile; B.P. 93–95° C./0.75 mm. Hg.

(b) 1 - (p - chlorophenyl)cyclobutanecarbonitrile; B.P. 168–169° C./20 mm. Hg.

(c) 1 - (o - bromophenyl)cyclobutanecarbonitrile; M.P. 80–82° C., following crystallization from benzene-petroleum ether.

(d) 1 - (m - bromophenyl)cyclobutanecarbonitrile; B.P. 103–105° C./0.3 mm. Hg.

(e) 1 - o - tolylcyclobutanecarbonitrile; B.P. 92–95° C./0.325 mm. Hg.

(f) 1 - m - tolylcyclobutanecarbonitrile; B.P. 149–151° C./14 mm. Hg.

(g) 1 - p - tolylcyclobutanecarbonitrile; B.P. 151–153° C./14 mm. Hg.

(h) 1 - ($\alpha,\alpha,\alpha$ - trifluoro - o-tolyl)cyclobutanecarbonitrile; B.P. 80–82° C./0.3 mm. Hg.

(i) 1 - ($\alpha,\alpha,\alpha$ - trifluoro - m-tolyl)cyclobutanecarbonitrile; B.P. 75–77° C./0.3 mm. Hg.

(j) 1 - $\alpha,\alpha,\alpha$ - trifluoro - p-tolyl)cyclobutanecarbonitrile; B.P. 76–78° C./0.3 mm. Hg.

(k) 1 - (p - methoxyphenyl)cyclobutanecarbonitrile; B.P. 104–106° C./0.26 mm. Hg.

(l) 1 - phenylcyclobutanecarbonitrile; B.P. 140–142° C./14 mm. Hg.

The following 1 - arylcyclobutanecarboxamide intermediates were prepared by means of the reaction described in procedure II of Example 1 above:

(a) 1 - (m - chlorophenyl)cyclobutanecarboxamide; M.P. 50–51° C., following crystallization from benzene-petroleum ether.

(b) 1 - (p - chlorophenyl)cyclobutanecarboxamide; B.P. 138–139° C./0.2 mm. Hg.

(c) 1 - (o - chlorophenyl)cyclobutanecarboxamide; M.P. 115–117° C., following crystallization from benzene-petroleum ether.

(d) 1 - (m - bromophenyl)cyclobutanecarboxamide; M.P. 73–75° C., following crystallization from benzene-petroleum ether.

(e) 1 - o - tolylcyclobutanecarboxamide; M.P. 91–92° C., following crystallization from benzene-petroleum ether.

(f) 1 - m - tolylcyclobutanecarboxamide; M.P. 65–67° C., following crystallization from benzene-petroleum ether.

(g) 1 - p - tolylcyclobutanecarboxamide; M.P. 48–50° C., following crystallization from benzene-petroleum ether.

(h) 1 - ($\alpha,\alpha,\alpha$ - trifluoro - o-tolyl)cyclobutanecarboxamide; M.P. 127–129° C., following crystallization from benzene-petroleum ether.

(i) 1 - ($\alpha,\alpha,\alpha$ - trifluoro - m-tolyl)cyclobutanecarboxamide; B.P. 118–120° C./0.25 mm. Hg.

(j) 1 - ($\alpha,\alpha,\alpha$ - trifluoro - p-tolyl)cyclobutanecarboxamide; M.P. 69–70° C., following crystallization from benzene-petroleum ether.

(k) 1 - (p - methoxyphenyl)cyclobutanecarboxamide; M.P. 125–127° C., following crystallization from benzene-petroleum ether.

(l) 1 - phenylcyclobutanecarboxamide; M.P. 74–76° C., following crystallization from benzene-petroleum ether.

The following (1 - arylcyclobutyl)carbonyl isocyanate compounds were prepared by means of the reaction described in procedure III of Example 1 above:

(a) [1 - (m - chlorophenyl)cyclobutyl]carbonyl isocyanate; B.P. 84–86° C./0.5 mm. Hg.

(b) [1 - (p - chlorophenyl)cyclobutyl]carbonyl isocyanate; B.P. 86–88° C./0.6 mm. Hg.

(c) [1 - (o - bromophenyl)cyclobutyl]carbonyl isocyanate; B.P. 98–100° C./0.5 mm. Hg.

(d) [1 - (m - bromophenyl)cyclobutyl]carbonyl isocyanate; B.P. 110–112° C./0.6 mm. Hg.

(e) (1-o-tolylcyclobutyl)carbonyl isocyanate; B.P. 70–72° C./0.5 mm. Hg.

(f) (1-m-tolylcyclobutyl)carbonyl isocyanate; B.P. 70–72° C./0.4 mm. Hg.

(g) (1-p-tolylcyclobutyl)carbonyl isocyanate; B.P. 78–80° C./0.7 mm. Hg.

(h) [1-($\alpha,\alpha,\alpha$-trifluoro-o-tolyl)cyclobutyl]carbonyl isocyanate; B.P. 68–70° C./0.3 mm. Hg.

(i) [1-($\alpha,\alpha,\alpha$-trifluoro-m-tolyl)cyclobutyl]carbonyl isocyanate; B.P. 70–72° C./0.6 mm. Hg.

(j) [1-($\alpha,\alpha,\alpha$-trifluoro-p-tolyl)cyclobutyl]carbonyl isocyanate; B.P. 69–70° C./0.6 mm. Hg.

(k) [1-(p - methoxyphenyl)cyclobutyl]carbonyl isocyanate; B.P. 99–100° C./0.7 mm. Hg.

(l) (1-phenylcyclobutyl)carbonyl isocyanate; B.P. 70–72° C./0.4 mm. Hg.

EXAMPLE 3

A solution of 20 g. of [1-(o-chlorophenyl)cyclobutyl] carbonyl isocyanate in 300 ml. of anhydrous ether is added, with stirring, to 500 ml. of liquid ammonia, cooled to −30 to −35° C., the resulting mixture is diluted with 1000 ml. of ether, and the excess ammonia is allowed to evaporate at room temperature. The crystalline precipitate of {[1-(o - chlorophenyl)cyclobutyl]carbonyl}urea that is obtained is isolated, washed with n-heptane, and dried; M.P. 176–178° C., following crystallization from n-heptane-benzene.

In a similar manner, the following [(1-arylcyclobutyl)carbonyl]urea compounds are obtained from the reaction of an appropriately substituted (1-arylcyclobutyl)-carbonyl isocyanate compound with an excess of liquid ammonia. All the products except that in A were purified by crystallization from n-heptane-benzene.

(A) [(1-phenylcyclobutyl)carbonyl]urea; M.P. 124–125° C., following crystallization from methanol-water.
(B) {[1-(m - chlorophenyl)cyclobutyl]carbonyl}urea; M.P. 147–148° C.
(C) {[1-(p - chlorophenyl)cyclobutyl]carbonyl}urea; M.P. 134–136° C.
(D) {[1-(o - bromophenyl)cyclobutyl]carbonyl}urea; M.P. 170–172° C.
(E) {[1-(m - bromophenyl)cyclobutyl]carbonyl}urea; M.P. 151–153° C.
(F) [(1-o - tolylcyclobutyl)carbonyl]urea; M.P. 141–143° C.
(G) [(1-m-tolylcyclobutyl)carbonyl]urea; M.P. 132–134° C.
(H) {[1 - ($\alpha,\alpha,\alpha$-trifluoro-o-tolyl)cyclobutyl]carbonyl}urea; M.P. 170–172° C.
(I) {[1 - ($\alpha,\alpha,\alpha$-trifluoro-m-tolyl)cyclobutyl]carbonyl}urea; M.P. 132–134° C.
(J) {[1 - ($\alpha,\alpha,\alpha$-trifluoro-p-tolyl)cyclobutyl]carbonyl}urea; M.P. 168–169° C.
(K) {[1-(p-methoxyphenyl)cyclobutyl]carbonyl}urea; M.P. 158–160° C.

EXAMPLE 4

A mixture consisting of 10 g. of (1-phenylcyclobutyl)-carbonyl chloride and 20 g. of urea is heated at 120° C. for 20 minutes. Upon cooling, the mixture is washed well with ether, the ether washings are discarded, and the residue is triturated with dilute aqueous sodium carbonate. The solid [(1-phenylcyclobutyl)carbonyl]urea that is obtained is isolated, washed with water, and crystallized from methanol-water; M.P. 124–125° C.

EXAMPLE 5

A mixture consisting of 10 g. of (1-phenylcyclobutyl)-carbonyl chloride and 30 g. of methylurethan is heated at 110–120° C. for 20 minutes. Upon cooling, the mixture is washed with ether, and the ether washings are discarded. The residue is triturated with dilute aqueous sodium carbonate, and the solid [(1-phenylcyclobutyl)-carbonyl]carbamic acid, methyl ester that is obtained is isolated, washed with water, dried, and crystallized from n-heptane-benzene; M.P. 109–110° C.

In the foregoing procedure, with the substitution of 30 g. of urethan for the methylurethan, there is obtained [(1-phenylcyclobutyl)carbonyl]carbamic acid, ethyl ester; M.P. 88–90° C., following crystallization from n-heptane-benzene.

What is claimed is:
1. A compound having the formula

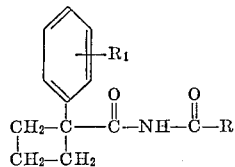

where R is a member of the class consisting of $NH_2$ and lower alkoxy; and $R_1$ is a member of the class consisting of hydrogen, chlorine, bromine, methyl, methoxyl, and trifluoromethyl.

2. A compound according to claim 1 wherein R is methoxyl.
3. A compound according to claim 1 wherein R is ethoxyl.
4. A compound according to claim 1 wherein R is $NH_2$.
5. A compound according to claim 1 which is {[1-(o-chlorophenyl)cyclobutyl]carbonyl}carbamic acid, methyl ester.
6. A compound according to claim 1 which is [(1-phenylcyclobutyl)carbonyl]carbamic acid, methyl ester.
7. A compound according to claim 1 which is {[1-(o-bromophenyl)cyclobutyl]carbonyl}carbamic acid, methyl ester.
8. A compound according to claim 1 which is [(1-o-tolylcyclobutyl)carbonyl]carbamic acid, methyl ester.
9. A compound according to claim 1 which is [(1-phenylcyclobutyl)carbonyl]urea.

References Cited

Finar, I. L., Organic Chemistry, publ. by R. Clay and Co., Ltd. Suffolk, pages 383 and 386 relied on.

LORRAINE A. WEINBERGER, Primary Examiner

L. A. THAXTON, Assistant Examiner

U.S. Cl. X.R.
260—553; 999